United States Patent [19]

Ragout et al.

[11] 4,208,067
[45] Jun. 17, 1980

[54] FLEXIBLE HOSES

[75] Inventors: Bernard Ragout; Gérard Devlacminck, both of Clermont-Ferrand, France

[73] Assignee: Pneumatiques, Caoutchouc Manufacture et Plastiques Kleber-Colombes, Colombes, France

[21] Appl. No.: 892,753

[22] Filed: Apr. 3, 1978

[30] Foreign Application Priority Data

Apr. 8, 1977 [FR] France ............................. 77 11189

[51] Int. Cl.² ............................................. F16L 33/22
[52] U.S. Cl. ..................................... 285/242; 285/259
[58] Field of Search ............... 285/242, 243, 259, 256, 285/252, 253, 255

[56] References Cited

U.S. PATENT DOCUMENTS

| | | | |
|---|---|---|---|
| 371,231 | 10/1887 | Turner | 285/243 |
| 2,119,645 | 6/1938 | Pearson | 285/243 X |
| 3,087,746 | 4/1963 | Hamilton et al. | 285/243 |
| 3,167,334 | 1/1965 | Cline et al. | 285/243 |
| 3,303,669 | 2/1967 | Oetiker | 285/252 X |
| 3,347,571 | 10/1967 | New | 285/256 X |
| 3,589,752 | 6/1971 | Spencer | 285/259 |
| 3,687,491 | 8/1972 | Marshall | 285/242 |

*Primary Examiner*—Thomas F. Callaghan
*Attorney, Agent, or Firm*—Brisebois & Kruger

[57] ABSTRACT

This invention relates to flexible high-pressure hoses of the kind having a wall made of elastomeric material which is strengthened by a stress-resistant reinforcement which is embedded in the wall and which is formed by at least two superimposed layers of cables inclined in opposite directions, with, at one end, an obturating or connecting device comprising a spigot which is inserted in the hose and an external clamping collar, the spigot and the collar having, on their adjacent surfaces, a channel in the one case and a corresponding ridge in the other.

According to the invention, the channel and the ridge each have parallel clamping surfaces which are inclined in opposite directions and their radial height is substantially equal to or slightly greater than the thickness of the wall of the hose so that, in the state where the device is assembled to the hose, the crest of the ridge at least partly enters the channel.

2 Claims, 7 Drawing Figures

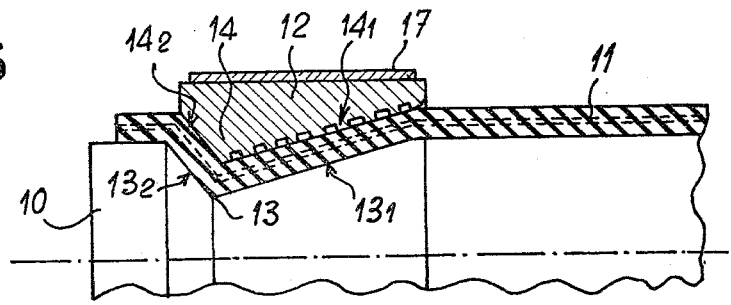
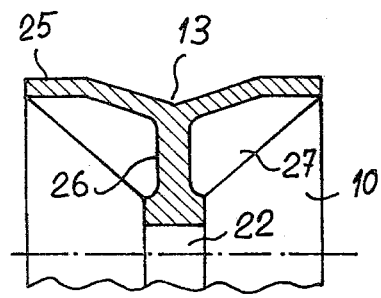
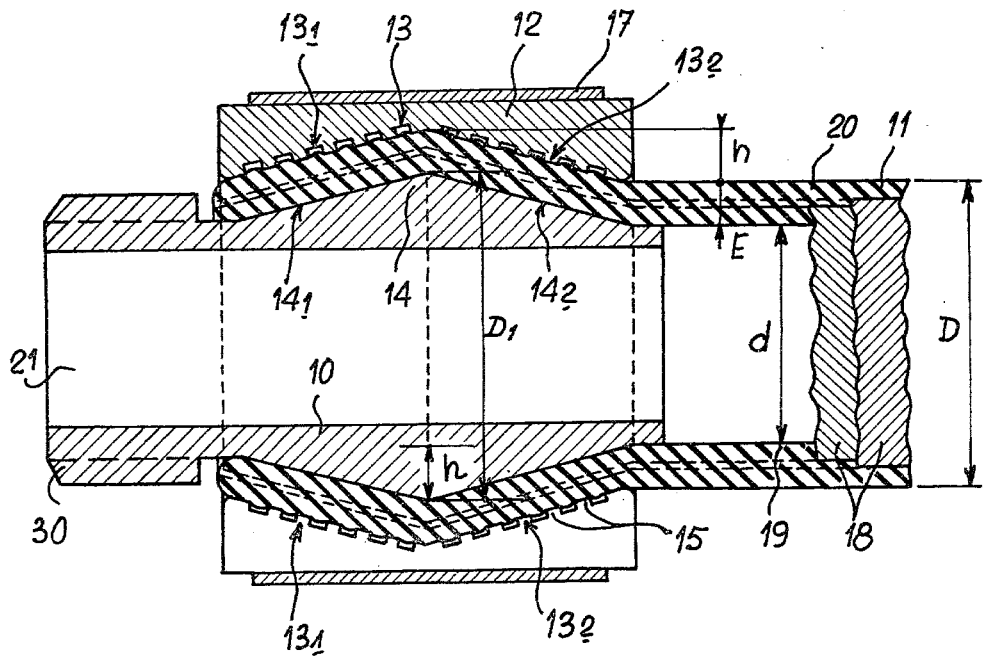

FLEXIBLE HOSES

BACKGROUND OF THE INVENTION

The present invention relates to flexible hoses intended to contain a fluid under high presurre, of the kind having a wall made of elastomeric material which is strengthened by a stress-resistant reinforcement embedded in it, and of which at least one end is fitted with an obturating or connecting device.

It is an object of the invention to enable such flexible hoses to be used for example for weighing or lifting loads and enable them to contain a fluid of which the pressure may be 200 bars or more. It is a further object that the hoses may also be used to convey fluids at very high pressures.

SUMMARY OF THE INVENTION

To achieve the above and other objects, the invention provides a flexible high-pressure hose having a wall made of elastomeric material which is strengthened by a stress-resistant reinforcement which is embedded in the wall and which is formed by at least two superimposed layers of cables inclined in opposite directions, with, at one end, an obturating or connecting device comprising a spigot which is inserted in the hose and an external clamping collar, the spigot and the collar having, on their adjacent surfaces, a channel in the one case and a corresponding ridge in the other, wherein said channel and said ridge each have parallel clamping surfaces which are inclined in opposite directions and whose radial height is not substantially less than the thickness of the wall of said hose so that, in the state where the device is assembled to said hose, the crest of said ridge at least partly enters said channel.

BRIEF DESCRIPTION OF THE DRAWINGS

In order that the invention may be more clearly understood, reference will now be made to the accompanying drawings which show some embodiments thereof by way of example and in which:

FIGS. 3, 4 and 5 are axial half-sections of modified versions of this device, FIG. 6 is a axial half-section of another embodiment of the spigot of the device, FIG. 7 is an axial section through the end of a hose fitted with a device intended for use as a connector.

DETAILED DESCRIPTION OF PREFERRED EMBODIMENTS

Figure 1:
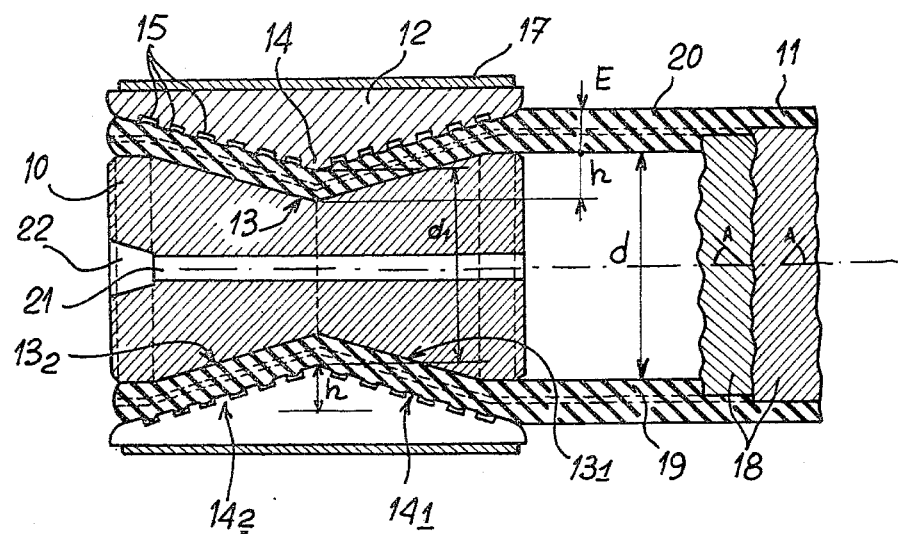
FIGS. 1 and 2 are an elevation view in axial section and an end-on view, of the end of a hose fitted with a first embodiment of connecting device.

Referring now to the drawings, the flexible hoses to which the invention relates comprise, in general terms, a wall 11 of elastomer which is strengthened on the inside by a stress-resistant reinforcement embedded in the wall which is formed by at least one pair of superimposed plies 18 of parallel, textile or metal cables which are inclined in opposite directions in the two plies. For the majority of anticipated applications, the angle of inclination A of cables in the reinforcement plies relative to the generatrices, i.e. the longitudinal central axis, of the hose is the angle of equilibrium, at which pressurisation of the hose does not result in any substantial alteration in its diameter. In the wall 11 of the hose, the reinforcement plies 18 define an inner layer 19 or tube and an outer layer 20 or covering, both made of flexible rubber. At at least one end, and generally at both ends, the hoses are fitted with devices for obturating them or for connecting them to another flexible hose or to an installation which supplies a fluid at high pressure. The devices in question generally comprise a spigot 10 which is inserted in the end of the hose wall 11, and a collar 12 to clamp the wall against the outer surface of the spigot. On their adjoining faces, the spigot and the collar have in the one case a channel 13 and in the other a ridge 14 of corresponding shape, the channel and the ridge each having clamping surfaces, which are inclined in opposite directions.

Figure 2:
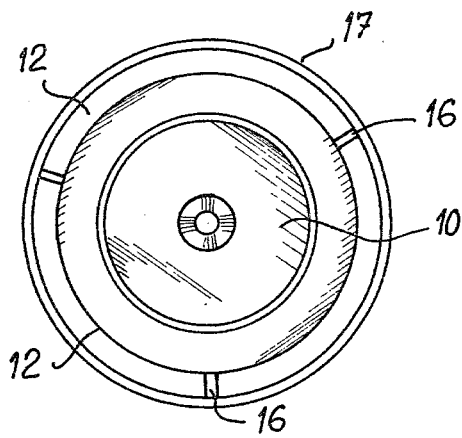

In the cases of FIGS. 1 and 2, the spigot 10 of the device is a massive body-of-revolution part whose major outside diameter is substantially equal to the nominal inside diameter d of the hose. In its outer face, the spigot has a channel 13 of double tapering shape in cross-section, which forms two tapering clamping surfaces 13.1 and 13.2 which are symmetrical about the bottom of the channel. For its part, on its inner face, the collar 12 has a ridge 14 of the same double tapering shape forming two tapering clamping surfaces 14.1 and 14.2 which are symmetrical about the crest of the ridge. The clamping surfaces 14.1 and 14.2 of the collar taper at the same angle as the clamping surfaces of the spigot and so, when the device is in the assembled state, the clamping surfaces of the spigot and the clamping surfaces of the collar are substantially parallel to one another. The clamping surfaces 14.1 and 14.2 of the collar also contain circular indentations 15, while the clamping surfaces 13.1 and 13.2 of the spigot are smooth or substantially smooth.

To enable it to be fitted, the collar 14 is made up of a plurality of separate arcuate sections, three in the instant embodiment, and a clamping means is provided to hold the arcuate sections of the collar clamped against the wall of the hose. In the embodiment illustrated, this clamping means is a tubular confining band 17 which is engaged axially over the arcuate sections of the collar. In the fitted state, the arcuate sections are separated by narrow longitudinal intervals or gaps 16. Provision could also be made for the arcuate sections to come into abutment with one another in the assembled state, the width of the gaps 16 then being reduced to nothing, in order to make the device sealed on the outside. At the time of fitting, the spigot 10 is inserted in the hose 11 with a small amount of force until the end of the hose reaches the outside face of the spigot. The three arcuate sections of the collar 12 are fitted around the hose with the crest of the internal ridge 14 coinciding axially with the bottom of the channel 13. The three arcuate sections are then forced in radially to squeeze the wall of the tube into the channel 13 and to clamp it between the corresponding tapering surfaces 13.1, 14.1 and 13.2, 14.2 of the spigot and the collar. Finally, the confining band 17 is threaded over the collar 12 axially to hold the arcuate sections in the clamped up position.

In operation, when the hose 11 is under pressure, the spigot 10 is subject to an axial force tending to expel it from the hose. However, by reason of the clamping action and the grip of the collar 12 on the covering 20 of the hose, the collar resists any axial sliding movement. The effect of the axial force exerted on the spigot 10 is thus mainly to increase the extent to which the flexible wall of the hose is clamped between the tapering surfaces 13.1 and 14.1 of the spigot and the collar and thus to prevent the device from leaking in any way under the pressure, even in the event of the rubber flowing.

In manufacturing the device described above, it is important to observe certain proportions in respect of dimensions. Thus, it is advantageous for the channel 13 and the ridge 14 of the spigot and the collar to have respective radial heights h such that, in the state where they are fitted to the hose and allowing for the reduction in the thickness of the wall of the hose due to the clamping, the crest of the ridge 14 at least partly enters the channel 13 to lie along a circle whose diameter d1 is less than the outside diameter d of the spigot 10. In this way, axial forces experienced by the wall of the hose clamped between the spigot and the collar (as a result of the pressure in the hose or traction on the hose) subject the wall of the hose more to radial compression strains than to axial shear strains. The reinforcing plies 18, which are embedded in the wall of the pipe and are thus squeezed in to a diameter less than that of the spigot in order to follow a path around the ridge 14, co-operate to this end. In practice, the height h of the ridge and the channel may be substantially equal to the nominal thickness E of the wall of the hose with the possibility of variation on either side of this value, as dictated in one direction by the extent to which the wall of the hose is to be clamped and in the other direction by the need to avoid large and abrupt deformations of the wall of the hose which could result in local weakening. In this respect, it is advantageous for the clamping faces of the spigot and the collar to have a relatively shallow inclination, of the order of 10° to 20° for example, (that is to say to form an included angle of 20° to 40°) which, in view of the radial height of the channel and the ridge, results in clamping surfaces of fairly considerable extent in the longitudinal direction of the hose. Similarly, it is advantageous for the clamping surfaces to be substantially parallel to make the stress in the wall of the hose when it clamped between the spigot and the collar uniform. Finally, the circular indentations 15 which are provided in the clamping surfaces 14.1 and 14.2 of the collar to improve its anchoring to the covering of the hose are preferably of a height not greater than the thickness of the covering 20.

The spigot 10 may be pierced with an axial hole 21 and may be arranged for connection to a duct for supplying fluid under pressure. In the embodiment shown, the spigot has a threaded hole 22 at the front for a connecting piece to be screwed in. Other connecting means may be used for this purpose.

Alternatively, the spigot may be solid and may possibly include, at the outer end, means for attaching it to a fixed member to hold the hose or to a movable member for exerting traction on the hose.

Figure 3:
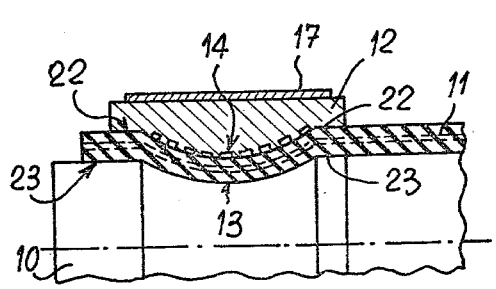
Figure 4:
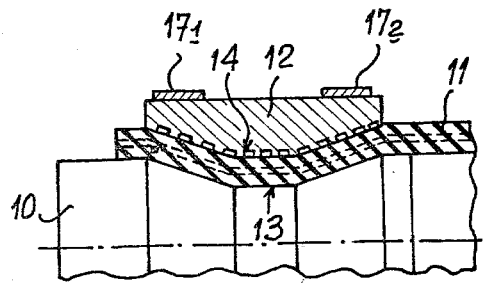

It is obviously possible to produce other embodiments on the basis of that described above. Thus, while observing the proportions set forth above, the clamping surfaces of the spigot and the collar may be made of shapes other than the symmetrical double tapering one illustrated. FIGS. 3 and 4 are schematic view of an embodiment in which the channel 13 and the ridge 14 are of corresponding rounded shapes, and of an embodiment in which the channel 13 and the ridge 14 are of corresponding trapezoid shapes in cross-section with an intermediate cylindrical part.

Also, it can be seen in FIG. 3 that the collar continues on either side of the ridge 14 into cylindrical surfaces 22 which correspond to cylindrical surface 23 on the spigot. The surfaces 22 could be provided on only one side of the ridge, for example on the axially outer side of the device. In FIG. 4, it can also be seen that the collar 12 is clamped up by spaced confining bands 17.1 and 17.2, which, for fitting purposes, enable the radial squeezing force to be exerted on the central areas of the components of the collar and the confining bands 17.1 and 17.2 to be inserted axially in opposite directions before the squeezing force is relaxed, which facilitates assembly. These features are obviously applicable to all the various embodiments described.

FIG. 5 shows another embodiment in which the clamping surfaces 13.1, 13.2 and 14.1, 14.2 of the spigot 13 and the ridge 14 are not symmetrical about the bottom of the channel and the crest of the ridge. At least one pair of these clamping surfaces, that is to say the surfaces 13.1 and 14.1 which converge towards the axis and towards the end of the hose, have a shallow inclination, while the other two clamping surfaces 13.2 and 14.2 have a steeper inclination. This embodiment may be used to reduce the axial length of the device.

FIG. 6 shows yet another modified embodiment of the spigot 10, which is in the form of a hollowed out pulley having a circular outer part 25 containing a channel 13 and a central web 26 which is strengthened by ribs 27 and which may be pierced by a threaded hole 22 for the purposes of connecting a fitting for supplying fluid under pressure or of attaching a fastening member.

FIG. 7 shows another embodiment of the invention in which the flexible hose 11 is fitted with a connecting device which once again comprises a spigot 10 inserted in the end of the hose 11 and external clamping collar 12 consisting of a plurality of arcuate sections which are held in place by a confining band 17 for example, the spigot and the collar having on their adjacent faces a ridge 14 and a channel 13 which have clamping surfaces 13.1, 13.2 and 14.1, 14.2 of shallow and opposite inclinations whose radial height h is equal to or greater than the thickness E of the wall of the hose so that, when the device is in the assembled state, the crest of the ridge at least partly enters the channel. However, in comparison with the embodiments described previously, the ridge 14 is arranged on the spigot 10 and the channel 13 in the clamping collar 12 of the device, so that in this case the configuration of the clamping surfaces is reversed. This embodiment is more suitable when the device is used as a connector, by reason of the fact that with it it is easier to make a bore 21 of large, unobstructed cross-section in the spigot 10 whose diameter is equal to or close to the nominal inside diameter d of the hose 11. The connection is made to the spigot 10, which for this purpose has at the outer end appropriate means such as a threaded rim 30 or any other equivalent connecting means such as flange, etc.

In this case too it is advantageous to observe the dimensional proportions set forth above in respect of the form of the clamping surfaces of the spigot and the collar.

In relation to the hose 11 to be fitted, the outside diameter D1 of the ridge 14 on the spigot 10 is at least equal to and preferably slightly greater than the nominal outside diameter D of the hose, while the inside diameter of the collar is substantially equal to or slightly less than the nominal outside diameter D of the hose. At the time of fitting, the spigot 10 is inserted by force into the end of the hose in such a way that the ridge 14 expands the wall of the hose and then the collar 12 is placed in position to squeeze the hose against the spigot and clamp it radially. Here too, the device is particularly advantageous in association with a flexible hose 11 whose wall contains an internal reinforcement consisting of superimposed reinforcing plies 18 made up of cables inclined in opposite directions, since the effectiveness of the clamping and sealing action, added to the self-locking effect which is obtained when the hose is subjected to axial stresses, make it possible to obtain a hose/connector combination which is particularly resistant to high pressure and to longitudinal tractive forces.

We claim:

1. In a flexible, high-pressure hose having
   (a) a wall made of elastomeric material;
   (b) a stress-resistant reinforcement formed by at least two superimposed layers of cables inclined in opposite directions and embedded in said wall so as to define a flexible outer covering of said elastomeric material,
   (c) a spigot inserted in one end of said hose;
   (d) an external clamping collar surrounding said end of the hose in which said spigot is inserted; the spigot and the collar having formed on their respective adjacent surfaces a single channel and a single corresponding ridge having a radial height at least equal to the thickness of said wall, the channel and the ridge each have clamping surfaces inclined in opposite directions, and being of a radial height h not less than the thickness E of the wall of the hose, the improvements that;
   (e) the said clamping surfaces of the channel and the ridge are parallel,
   (f) that the clamping surfaces of said collar are formed to define fastening indentations of a depth not greater than the thickness of the flexible outer covering of the wall of the hose,
   (g) the corresponding clamping surfaces of the spigot are substantially smooth, and that the corresponding clamping surfaces of said spigot and said collars are assymmetrical about the bottom of the channel and about the crest of the ridge respectively, two of the said surfaces having a shallow inclination of between 10° and 20° and two of said surfaces having a steeper inclination.

2. In a flexible, high pressure hose as claimed in claim 1 wherein said spigot is formed with a radially outwardly extending ridge defined by oppositely inclined clamping surfaces and said collar is formed with oppositely inclined clamping surfaces defining a channel the sides of which are parallel to the clamping surfaces on said spigot.

* * * * *